US007474359B2

(12) United States Patent
Sullivan et al.

(10) Patent No.: US 7,474,359 B2
(45) Date of Patent: Jan. 6, 2009

(54) SYSTEM AND METHOD OF DISPLAYING A VIDEO STREAM

(75) Inventors: Marc Andrew Sullivan, Austin, TX (US); Philip Ted Kortum, Austin, TX (US); Jeffrey Lewis Brandt, Cedar Park, TX (US)

(73) Assignee: AT&T Intellectual Properties I, L.P., Reno, NV (US)

( * ) Notice: Subject to any disclaimer, the term of this patent is extended or adjusted under 35 U.S.C. 154(b) by 385 days.

(21) Appl. No.: 11/005,496

(22) Filed: Dec. 6, 2004

(65) Prior Publication Data
US 2006/0123445 A1 Jun. 8, 2006

(51) Int. Cl.
*H04N 5/50* (2006.01)
(52) U.S. Cl. .............. 348/731; 348/14.12; 348/723; 348/554
(58) Field of Classification Search ......... 348/731–733, 348/725, 728, 554–557, 14.03, 14.05, 14.11–14.12, 348/14.14, 21–22, 384.1–390.1; 725/38, 725/40, 90–91, 98, 115, 134; *H04N 5/50*
See application file for complete search history.

(56) References Cited
U.S. PATENT DOCUMENTS

| 4,243,147 | A | 1/1981 | Twitchell et al. |
| 4,356,509 | A | 10/1982 | Skerlos et al. |
| 4,768,926 | A | 9/1988 | Gilbert, Jr. |
| 4,907,079 | A | 3/1990 | Turner et al. |
| 5,126,731 | A | 6/1992 | Cromer, Jr. et al. |
| 5,163,340 | A | 11/1992 | Bender |
| 5,475,835 | A | 12/1995 | Hickey |
| 5,532,748 | A | 7/1996 | Naimpally |
| 5,541,917 | A | 7/1996 | Farris |
| 5,589,892 | A | 12/1996 | Knee et al. |
| 5,592,477 | A | 1/1997 | Farris et al. |
| 5,610,916 | A | 3/1997 | Kostreski et al. |

(Continued)

FOREIGN PATENT DOCUMENTS

WO    WO 99/63759 A2    12/1999

(Continued)

OTHER PUBLICATIONS

Kapinos, S., "Accenda Universal Remote Control Targets Needs of Elderly, Visually Impaired, Physically Challenged . . . and the Rest of Us" Innotech Systems, Inc., Press Release, Port Jefferson, NY, Dec. 15, 2002.

(Continued)

*Primary Examiner*—Trang U Tran
(74) *Attorney, Agent, or Firm*—Toler Law Group

(57) ABSTRACT

The present disclosure is generally directed to a video stream processing system and to a method of displaying a video stream. In a particular embodiment, the method includes receiving a video stream to be displayed on a display device. During a first time period, a low resolution version of the video stream is displayed while a full resolution version of the video stream is being recovered. The method further includes synchronizing the low resolution version of the video stream with the full resolution version of the video stream, and, during a second time period after the first time period, switching between display of the low resolution version of the video stream to display of the full resolution version of the video stream.

10 Claims, 4 Drawing Sheets

U.S. PATENT DOCUMENTS

| | | | |
|---|---|---|---|
| 5,613,012 A | 3/1997 | Hoffman et al. |
| 5,650,831 A | 7/1997 | Farwell |
| 5,651,332 A | 7/1997 | Moore et al. |
| 5,656,898 A | 8/1997 | Kalina |
| 5,675,390 A | 10/1997 | Schindler et al. |
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,818,438 A | 10/1998 | Howe et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,021,158 A | 2/2000 | Schurr et al. |
| 6,021,167 A | 2/2000 | Wu |
| 6,028,600 A | 2/2000 | Rosin et al. |
| 6,029,045 A | 2/2000 | Picco et al. |
| 6,038,251 A | 3/2000 | Chen |
| 6,038,257 A * | 3/2000 | Brusewitz et al. ...... 375/240.21 |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,692 B1 | 2/2001 | Hsu |
| 6,215,483 B1 | 4/2001 | Zigmond |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,311,214 B1 | 10/2001 | Rhoads |
| 6,314,409 B2 | 11/2001 | Schneck et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,414,725 B1 * | 7/2002 | Clarin et al. ................ 348/714 |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,481,011 B1 | 11/2002 | Lemmons |
| 6,486,892 B1 | 11/2002 | Stern |
| 6,492,913 B2 | 12/2002 | Vierthaler et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,665,453 B2 * | 12/2003 | Scheurich ................... 382/298 |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,714,264 B1 | 3/2004 | Kemplsty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |

| | | |
|---|---|---|
| 6,785,716 B1 | 8/2004 | Nobakht |
| 6,788,709 B1 | 9/2004 | Hyakutake |
| 6,804,824 B1 | 10/2004 | Potrebic et al. |
| 6,826,775 B1 | 11/2004 | Howe et al. |
| 6,828,993 B1 | 12/2004 | Hendricks et al. |
| 6,909,874 B2 | 6/2005 | Holtz et al. |
| 6,938,021 B2 | 8/2005 | Shear et al. |
| 2001/0011261 A1 | 8/2001 | Mullen-Schultz |
| 2001/0016945 A1 | 8/2001 | Inoue |
| 2001/0016946 A1 | 8/2001 | Inoue |
| 2001/0034664 A1 | 10/2001 | Brunson |
| 2001/0044794 A1 | 11/2001 | Nasr et al. |
| 2001/0048677 A1 | 12/2001 | Boys |
| 2001/0049826 A1 | 12/2001 | Wilf |
| 2001/0054008 A1 | 12/2001 | Miller et al. |
| 2001/0054009 A1 | 12/2001 | Miller et al. |
| 2001/0054067 A1 | 12/2001 | Miller et al. |
| 2001/0056350 A1 | 12/2001 | Calderone et al. |
| 2002/0001303 A1 | 1/2002 | Boys |
| 2002/0001310 A1 | 1/2002 | Mai et al. |
| 2002/0002496 A1 | 1/2002 | Miller et al. |
| 2002/0003166 A1 | 1/2002 | Miller et al. |
| 2002/0007307 A1 | 1/2002 | Miller et al. |
| 2002/0007313 A1 | 1/2002 | Mai et al. |
| 2002/0007485 A1 | 1/2002 | Rodriguez et al. |
| 2002/0010639 A1 | 1/2002 | Howey et al. |
| 2002/0010745 A1 | 1/2002 | Schneider |
| 2002/0010935 A1 | 1/2002 | Sitnik |
| 2002/0016736 A1 | 2/2002 | Cannon et al. |
| 2002/0022963 A1 | 2/2002 | Miller et al. |
| 2002/0022970 A1 | 2/2002 | Noll et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0026475 A1 | 2/2002 | Marmor |
| 2002/0027541 A1* | 3/2002 | Cairns et al. ............... 345/87 |
| 2002/0029181 A1 | 3/2002 | Miller et al. |
| 2002/0030105 A1 | 3/2002 | Miller et al. |
| 2002/0032603 A1 | 3/2002 | Yeiser |
| 2002/0035404 A1 | 3/2002 | Ficco et al. |
| 2002/0040475 A1 | 4/2002 | Yap et al. |
| 2002/0042915 A1 | 4/2002 | Kubischta et al. |
| 2002/0046093 A1 | 4/2002 | Miller et al. |
| 2002/0049635 A1 | 4/2002 | Mai et al. |
| 2002/0054087 A1 | 5/2002 | Noll et al. |
| 2002/0054750 A1 | 5/2002 | Ficco et al. |
| 2002/0059163 A1 | 5/2002 | Smith |
| 2002/0059425 A1 | 5/2002 | Belfiore et al. |
| 2002/0059599 A1 | 5/2002 | Schein et al. |
| 2002/0065717 A1 | 5/2002 | Miller et al. |
| 2002/0067438 A1 | 6/2002 | Baldock |
| 2002/0069220 A1 | 6/2002 | Tran |
| 2002/0069282 A1 | 6/2002 | Reisman |
| 2002/0069294 A1 | 6/2002 | Herkersdorf et al. |
| 2002/0072970 A1 | 6/2002 | Miller et al. |
| 2002/0078442 A1 | 6/2002 | Reyes et al. |
| 2002/0097261 A1 | 7/2002 | Gottfurcht et al. |
| 2002/0106119 A1 | 8/2002 | Foran et al. |
| 2002/0112239 A1 | 8/2002 | Goldman |
| 2002/0116392 A1 | 8/2002 | McGrath et al. |
| 2002/0120931 A1* | 8/2002 | Huber et al. ............... 725/34 |
| 2002/0124055 A1 | 9/2002 | Reisman |
| 2002/0128061 A1 | 9/2002 | Blanco |
| 2002/0129094 A1 | 9/2002 | Reisman |
| 2002/0133402 A1 | 9/2002 | Faber et al. |
| 2002/0138840 A1 | 9/2002 | Schein et al. |
| 2002/0152264 A1 | 10/2002 | Yamasaki |
| 2002/0169611 A1 | 11/2002 | Guerra et al. |
| 2002/0170063 A1 | 11/2002 | Ansari et al. |
| 2002/0173344 A1 | 11/2002 | Cupps et al. |
| 2002/0188955 A1 | 12/2002 | Thompson et al. |
| 2002/0191116 A1* | 12/2002 | Kessler et al. ............... 348/723 |
| 2002/0193997 A1 | 12/2002 | Fitzpatrick et al. |
| 2002/0194601 A1 | 12/2002 | Perkes et al. |
| 2002/0198874 A1 | 12/2002 | Nasr et al. |
| 2003/0005445 A1 | 1/2003 | Schein et al. |
| 2003/0009771 A1 | 1/2003 | Chang |
| 2003/0012365 A1 | 1/2003 | Goodman |
| 2003/0014750 A1 | 1/2003 | Kamen |
| 2003/0018975 A1 | 1/2003 | Stone |
| 2003/0023435 A1 | 1/2003 | Josephson |
| 2003/0023440 A1 | 1/2003 | Chu |
| 2003/0028890 A1 | 2/2003 | Swart et al. |
| 2003/0033416 A1 | 2/2003 | Schwartz |
| 2003/0043915 A1 | 3/2003 | Costa et al. |
| 2003/0046091 A1 | 3/2003 | Ameson et al. |
| 2003/0046689 A1 | 3/2003 | Gaos |
| 2003/0056223 A1 | 3/2003 | Costa et al. |
| 2003/0058277 A1 | 3/2003 | Bowman-Amuah |
| 2003/0061611 A1 | 3/2003 | Pendakur |
| 2003/0071792 A1 | 4/2003 | Safadi |
| 2003/0093793 A1 | 5/2003 | Gutta |
| 2003/0100340 A1 | 5/2003 | Cupps et al. |
| 2003/0110161 A1 | 6/2003 | Schneider |
| 2003/0110503 A1 | 6/2003 | Perkes |
| 2003/0126136 A1 | 7/2003 | Omoigui |
| 2003/0135771 A1 | 7/2003 | Cupps et al. |
| 2003/0141987 A1 | 7/2003 | Hayes |
| 2003/0145321 A1 | 7/2003 | Bates et al. |
| 2003/0149989 A1 | 8/2003 | Hunter et al. |
| 2003/0153353 A1 | 8/2003 | Cupps et al. |
| 2003/0153354 A1 | 8/2003 | Cupps et al. |
| 2003/0159026 A1 | 8/2003 | Cupps et al. |
| 2003/0160830 A1 | 8/2003 | DeGross |
| 2003/0163601 A1 | 8/2003 | Cupps et al. |
| 2003/0163666 A1 | 8/2003 | Cupps et al. |
| 2003/0172380 A1 | 9/2003 | Kikinis |
| 2003/0182237 A1 | 9/2003 | Costa et al. |
| 2003/0182420 A1 | 9/2003 | Jones et al. |
| 2003/0185232 A1 | 10/2003 | Moore et al. |
| 2003/0187509 A1 | 10/2003 | Hayes et al. |
| 2003/0187641 A1 | 10/2003 | Moore et al. |
| 2003/0187646 A1 | 10/2003 | Smyers et al. |
| 2003/0187800 A1 | 10/2003 | Moore et al. |
| 2003/0189589 A1 | 10/2003 | LeBlanc et al. |
| 2003/0194141 A1 | 10/2003 | Kortum et al. |
| 2003/0194142 A1 | 10/2003 | Kortum et al. |
| 2003/0208396 A1 | 11/2003 | Miller et al. |
| 2003/0208758 A1 | 11/2003 | Schein et al. |
| 2003/0226044 A1 | 12/2003 | Cupps et al. |
| 2003/0226145 A1 | 12/2003 | Marsh |
| 2003/0229900 A1 | 12/2003 | Reisman |
| 2004/0003041 A1 | 1/2004 | Moore et al. |
| 2004/0003403 A1 | 1/2004 | Marsh |
| 2004/0006769 A1 | 1/2004 | Ansari et al. |
| 2004/0006772 A1 | 1/2004 | Ansari et al. |
| 2004/0010602 A1 | 1/2004 | Van Vleck et al. |
| 2004/0015997 A1 | 1/2004 | Ansari et al. |
| 2004/0030750 A1 | 2/2004 | Moore et al. |
| 2004/0031058 A1 | 2/2004 | Reisman |
| 2004/0031856 A1 | 2/2004 | Atsmon et al. |
| 2004/0034877 A1 | 2/2004 | Nogues |
| 2004/0049728 A1 | 3/2004 | Langford |
| 2004/0064351 A1 | 4/2004 | Mikurak |
| 2004/0068740 A1 | 4/2004 | Fukuda et al. |
| 2004/0068753 A1 | 4/2004 | Robertson et al. |
| 2004/0070491 A1 | 4/2004 | Huang et al. |
| 2004/0073918 A1 | 4/2004 | Ferman et al. |
| 2004/0098571 A1 | 5/2004 | Falcon |
| 2004/0107125 A1 | 6/2004 | Guheen et al. |
| 2004/0107439 A1 | 6/2004 | Hassell et al. |

| | | | |
|---|---|---|---|
| 2004/0111745 A1 | 6/2004 | Schein et al. | |
| 2004/0111756 A1 | 6/2004 | Stuckman et al. | |
| 2004/0117813 A1 | 6/2004 | Karaoguz et al. | |
| 2004/0117824 A1 | 6/2004 | Karaoguz et al. | |
| 2004/0128342 A1 | 7/2004 | Maes et al. | |
| 2004/0139173 A1 | 7/2004 | Karaoguz et al. | |
| 2004/0143600 A1 | 7/2004 | Musgrove et al. | |
| 2004/0143652 A1 | 7/2004 | Grannan et al. | |
| 2004/0148408 A1 | 7/2004 | Nadarajah | |
| 2004/0150676 A1 | 8/2004 | Gottfurcht et al. | |
| 2004/0183839 A1 | 9/2004 | Gottfurcht et al. | |
| 2004/0194136 A1 | 9/2004 | Finseth et al. | |
| 2004/0198386 A1 | 10/2004 | Dupray | |
| 2004/0201600 A1 | 10/2004 | Kakivaya et al. | |
| 2004/0210633 A1 | 10/2004 | Brown et al. | |
| 2004/0210935 A1 | 10/2004 | Schein et al. | |
| 2004/0213271 A1 | 10/2004 | Lovy et al. | |
| 2004/0221302 A1 | 11/2004 | Ansari et al. | |
| 2004/0223485 A1 | 11/2004 | Arellano et al. | |
| 2004/0226035 A1 | 11/2004 | Hauser, Jr. | |
| 2004/0226045 A1 | 11/2004 | Nadarajah | |
| 2004/0239624 A1 | 12/2004 | Ramian | |
| 2004/0252119 A1 | 12/2004 | Hunleth et al. | |
| 2004/0252120 A1 | 12/2004 | Hunleth et al. | |
| 2004/0252769 A1 | 12/2004 | Costa et al. | |
| 2004/0252770 A1 | 12/2004 | Costa et al. | |
| 2004/0260407 A1 | 12/2004 | Wimsatt | |
| 2004/0261116 A1 | 12/2004 | McKeown et al. | |
| 2004/0267729 A1 | 12/2004 | Swaminathan et al. | |
| 2004/0268393 A1 | 12/2004 | Hunleth et al. | |
| 2005/0027851 A1 | 2/2005 | McKeown et al. | |
| 2005/0038814 A1 | 2/2005 | Iyengar et al. | |
| 2005/0044280 A1 | 2/2005 | Reisman | |
| 2005/0097612 A1 | 5/2005 | Pearson et al. | |
| 2005/0132295 A1 | 6/2005 | Noll et al. | |
| 2005/0195961 A1 | 9/2005 | Pasquale et al. | |
| 2007/0098079 A1* | 5/2007 | Boyce et al. | 375/240.25 |
| 2007/0211800 A1* | 9/2007 | Shi et al. | 375/240.16 |

FOREIGN PATENT DOCUMENTS

| | | |
|---|---|---|
| WO | WO 00/28689 A2 | 5/2000 |
| WO | WO 01/60066 A1 | 8/2001 |
| WO | WO 02/017627 A2 | 2/2002 |
| WO | WO 02/058382 A1 | 7/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/148,967, filed Jun. 9, 2005.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.

* cited by examiner

SYSTEM AND METHOD OF DISPLAYING A VIDEO STREAM

FIELD OF THE DISCLOSURE

The present disclosure relates to a system and method of displaying a video stream.

BACKGROUND

In a variety of situations in which television content is transmitted digitally, there can be a significant delay that occurs when switching from one source of video to another. Typically, the delay occurs while changing a television channel, but the delay also may occur when starting a new video stream in a number of situations. The delay depends on the specific situation, such as the type of video compression, the network bandwidth, and the decompression hardware. Further, the delay can occur when a new network stream is initiated and the delay can also occur when accessing video that is stored locally at Digital Video Recorder (DVR), a Personal Video Recorder (PVR), other local video storage device. Customers and users find this delay disconcerting. Moreover, the delay is of particular concern since analog televisions do not exhibit this type of delay.

Certain proposed solutions to the delay may be defined to fall into two classes. The simplest approach is to provide access to videos through a user interface that effectively hides the delay. This is the approach used by a variety of products in which the customer is effectively encouraged to navigate trough an Electronic Program Guide (EPG) and avoid directly switching channels. This method does not really solve the problem; it simply encourages the user to behave in a manner that causes the delay to be less noticeable. The second approach is to overpower the delay by bursting a very large amount of video data in a short amount of time. This technique requires the transmission of up to 10 times the normal amount of data in order to provide sufficient video data to begin rendering the video in a short amount of time after a channel is changed (e.g. less than 100 msec).

Both of these approaches attempt to address the problem of video delays, but the first requires customers' to change their behavior and the second places significant and expensive requirements on the local network and the rendering device.

Accordingly, there is a need for an improved system and method of displaying a video stream.

DETAILED DESCRIPTION OF THE DRAWINGS

The present disclosure is generally directed to a video stream processing system and to a method of displaying a video stream. In a particular embodiment, the method includes receiving a video stream to be displayed on a display device. During a first time period, a low resolution version of the video stream is displayed while a full resolution version of the video stream is being recovered. The method further includes synchronizing the low resolution version of the video stream with the full resolution version of the video stream, and, during a second time period after the first time period, switching between display of the low resolution version of the video stream to display of the full resolution version of the video stream.

In a particular embodiment, the video stream processing system includes a user interface to detect a channel change request; a video detection module responsive to the user interface, and a video generation module responsive to the video detection module. The video detection module is to receive a video stream to be displayed on a display device. The video generation module is to communicate to the display device a first version of the video stream while the video detection module recovers a second version of the video stream. The first version of the video stream has a lower video display quality than the second version of the video stream. The video generation module includes synchronization logic to synchronize the first version of the video stream with the second version of the video stream, and the video generation module switches between communicating the first version of the video stream to communicate the second version of the video stream to the display device.

Figure 1:
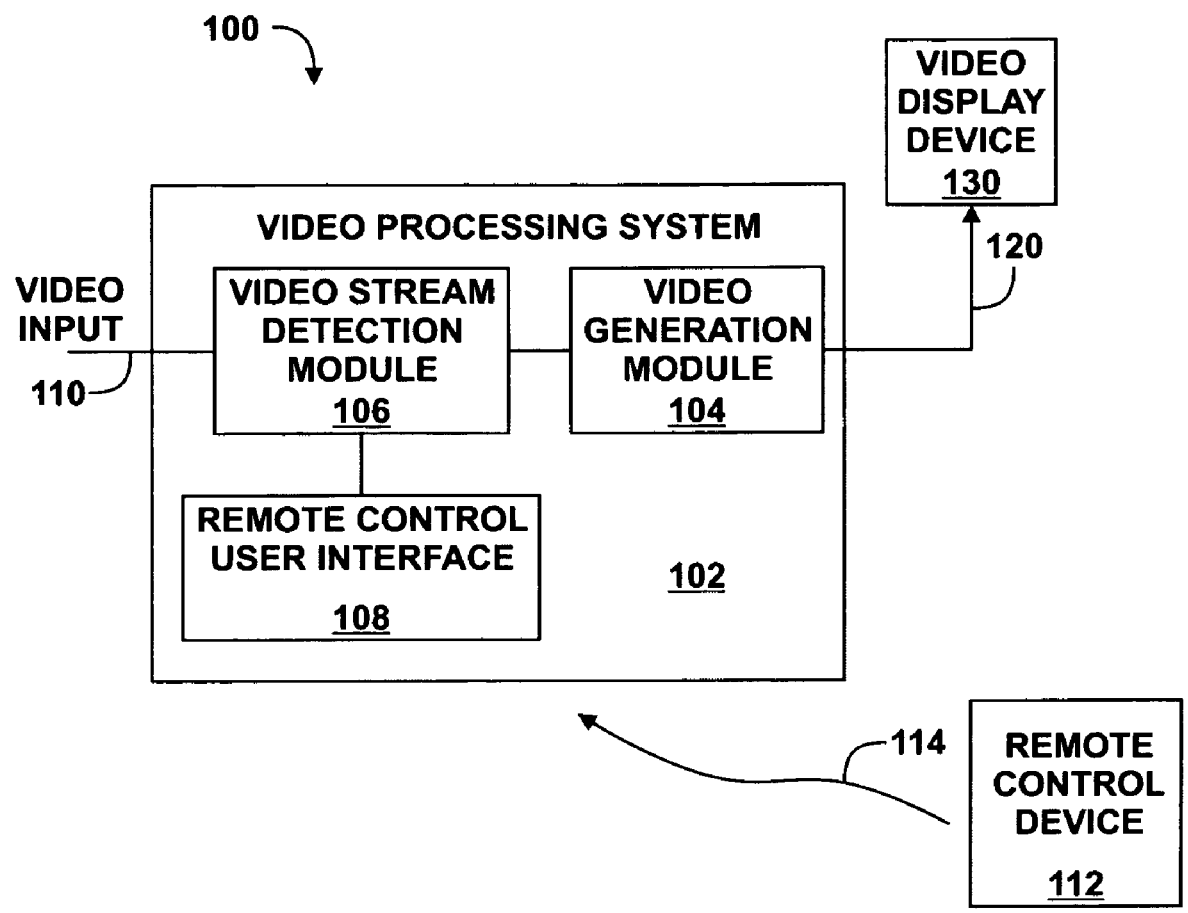
FIG. 1 is a block diagram of a video processing system.

Referring to FIG. 1, a video stream processing system is illustrated and is designated 100. The video stream processing system 100 includes a video processing system 102 coupled via a communication link 120 to a video display device 130, such as a television. An example of an appropriate communication link is a coaxial cable. The video processing system 102 includes a video input 110 and includes a remote control interface 108. The remote control interface 108 receives signals, such as infrared signals 114, from a remote control device 112. The video processing system 102 further includes a video stream detection module 106 and a video generation module 104. The video stream detection module 106 receives the video input 110 and is responsive to signals received at the remote control interface 108.

The video stream detection module 106 forwards detected and processed video streams to the video generation module 104. The video generation module 104 provides a video signal to be communicated over the coaxial cable 120 for display at the video display device 130.

In a particular embodiment, the remote control device 112 provides a channel request signal to request a channel change. The channel request signal may be communicated using the infrared or other wireless communication signal 114 to the remote control interface 108. The remote control interface 108 then communicates the received channel change request to the video stream detection module 106. The video stream detection module 106, in turn, tunes to the requested channel within the video input 110. Further, the video stream detection module 106 provides instructions and processed signals to the video generation module 104. Then, the video generation module provides a video image signal that corresponds to the newly selected channel.

Figure 2:
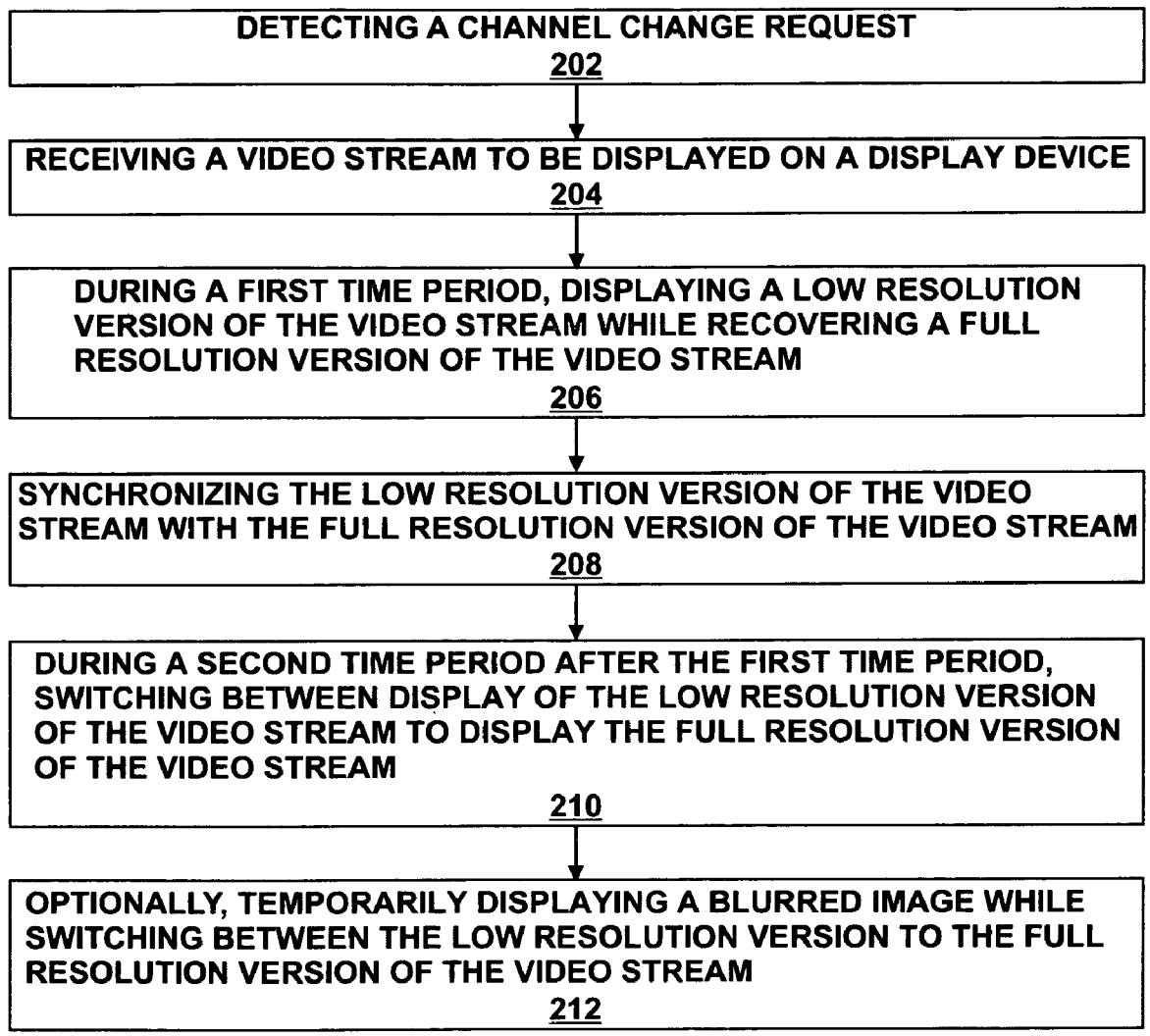
FIG. 2 is a flow chart that illustrates a first embodiment of a method of displaying a video stream.

Referring to FIG. 2, a particular embodiment of a method of displaying a video stream is illustrated. The method includes detecting a channel change request, at 202. The method further includes receiving a video stream to be displayed on a display device, at 204. Further, the method includes displaying a low resolution version of the video stream on a display device during a first time period while recovering a full resolution version of the video stream, as shown at 206. Typically, the first time period is in the range of 1-3 seconds, based on the delay. As illustrated in FIG. 2, the method further includes the step of synchronizing the low resolution version of the video stream with the full resolution version of the video stream, as shown at 208. During a second time period, at 210, the method includes switching between the display of the low resolution version of the video stream to display of the full resolution version of the video stream. The second time period occurs after the first time period. Optionally, the method includes temporarily displaying a blurred image on the display device while switching between the low resolution version of the video stream to the full resolution version of the video stream, as shown at 212.

Figure 3:
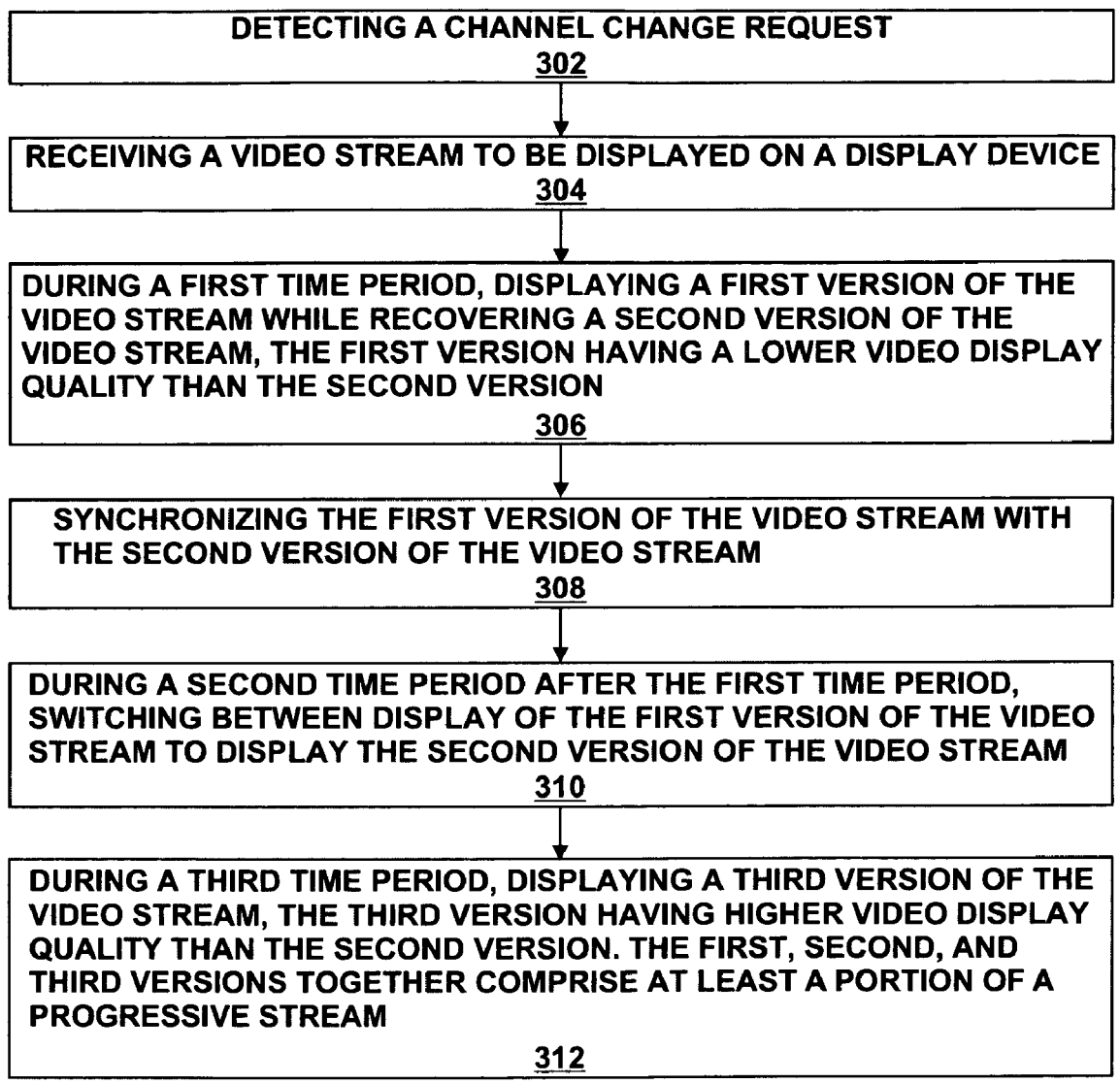
FIG. 3 is a flow chart that illustrates a second embodiment of a method of displaying a video stream.

Referring to FIG. 3, another embodiment of a method of displaying a video stream is illustrated. The method includes detecting a channel change request, at 302, and receiving a video stream to be displayed on a display device, at 304. The method further includes, during a first time period, displaying a first version of the video stream on a display device while recovering a second version of the video stream, at 306. Typically, the first time period is in the range of 1-3 seconds based on the delay. In a particular exemplary embodiment, the video generation module 104 provides a low resolution version of the video stream of the newly selected channel while the video stream detection module 106 is processing the video stream to recover a full resolution version.

In a particular illustrative embodiment, an audio signal is provided to the display during the first time period and the audio signal is provided with full resolution such that a video display device user hears full audio while the first version of the video stream is being displayed. In a particular embodiment, the first version of the video stream has a lower video display quality than the second version of the video stream. For example, the first version of the video stream may have a reduced color set when compared to the second version of the video stream. As another example, the first version may have a reduced spectral frequency or other visual parameter that is degraded when compared to the second version of the video stream. Thus, the first version of the video stream consumes less bandwidth and may be displayed on the display device more quickly in response to the channel change request.

The method further includes synchronizing the first version of the video stream with the second version of the video stream, as shown at 308. During a second time period after the first time period, the method includes switching between the display of the first version of the video stream to the display of the second version of the video stream, as shown at 310. Optionally, during a third time period, the method includes displaying a third version of the video stream where the third version has a higher video display quality than the second version of the video stream. In a particular example, the first, second, and third versions of the video stream together comprise a portion of a progressive video stream. The progressive video stream initially presents a low quality image and then, presents added resolution and higher quality images over a sequence of successive time periods.

Figure 4:
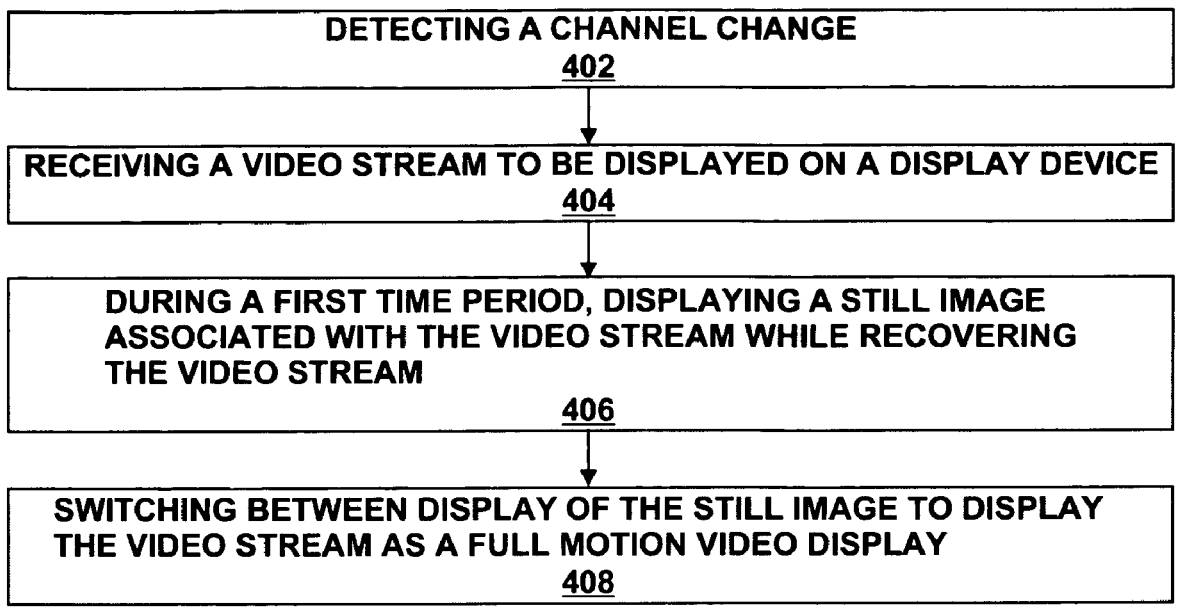
FIG. 4 is a flow chart that illustrates a third embodiment of a method of displaying a video stream.

Referring to FIG. 4, another exemplary embodiment of a method of displaying a video stream is illustrated. The method includes detecting a channel change, at 402, and receiving a video stream to be displayed on the display device, at 404. During a first time period, a still image is displayed, as shown at 406. The still image is associated with the video stream. The still image is displayed while recovering the full motion video stream after the request for the channel change. During a second time period after the first time period, the method includes switching between display of the still image to display of the video stream as a full motion video, as shown at 408. In a particular illustrative embodiment, an audio signal is provided to the display during the first time period and the audio signal is provided with full resolution such that the video display device user hears full audio while the still image is being displayed. In another embodiment, the still image may comprise a title screen associated with the video stream or may include a frame derived from the video stream. The title screen may include information regarding the video stream such as the title of an episode, the title of a series, or the title of a movie that is to be displayed on the screen.

While particular illustrative methods of displaying a video stream have been described, it should be understood that many alternate methods may also be used with the system illustrated in FIG. 1. In a particular illustrative embodiment, the first period of time when a low resolution video stream is displayed may be less than three seconds. In another embodiment, a full resolution audio signal is provided to the display device during the first period of time while displaying the low resolution version of the video stream, such as when displaying a still image or a degraded or reduced bandwidth type video stream as illustrated. In a particular exemplary embodiment, the first time period in which a low resolution version of a video stream is displayed occurs within 100 milliseconds after detecting a channel change request, such as a channel change request initiated by a user of the remote control device 112 shown in FIG. 1. Thus, a user surfing through channels of a display device may quickly determine the particular content of individual channels.

Previous methods of handling channel change requests for digital video have produced significant delays. Ignoring such delays can negatively impact a customer perception of service quality. Since this is a significant and negative departure from previous customer experiences with analog television signals, such delays are undesirable. The methods described provide a user experience with reduced delay, and allows the user to quickly determine desirability of continuing to watch a particular channel. Thus, the disclosed method and system offers an improved video user experience.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of displaying a video stream, the method comprising:

detecting a channel change;

receiving a video stream corresponding to a changed channel, the received video stream to be displayed on a display device;

during a first time period, displaying a first version of the received video stream while recovering a second version of the received video stream, the first version of the received video stream having a lower video display quality than the second version of the received video stream, wherein the first time period begins no more than approximately 100 milliseconds after the detected channel change;

synchronizing the first version of the received video stream with the second version of the received video stream; and switching from display of the first version of the received video stream to display of the second version of the received video stream during a second time period.

2. The method of claim 1, further comprising during a third time period, displaying a third version of the received video stream, the third version having higher video display quality than the second version, wherein the first version, the second version, and the third version together comprise a portion of a progressive video stream, wherein the progressive video stream initially presents a low quality image and then presents added resolution and higher quality images over a sequence of successive time periods.

3. The method of claim 1, wherein the first version has a reduced color set with respect to the second version.

4. The method of claim 1, further comprising displaying a blurred image on the display device while switching between the first version of the received video stream and the second version of the received video stream.

5. The method of claim 1, wherein the first time period is less than approximately three seconds.

6. A video stream processing system comprising:
   a user interface to detect a channel change request;
   a video detection module responsive to the user interface, the video detection module to receive a video stream to be displayed on a display device; and
   a video generation module responsive to the video detection module, the video generation module to communicate to the display device a first version of the received video stream while the video detection module recovers a second version of the received video stream, the first version of the received video stream having a lower video display quality than the second version of the received video stream, wherein the first version has a first resolution and the second version has a second resolution, wherein the second resolution is higher than the first resolution, the video generation module including synchronization logic to synchronize the first version of the received video stream with the second version of the received video stream;
   wherein the video generation module switches from communicating the first version of the received video stream to communicating the second version of the received video stream to the display device, and wherein the video generation module is to communicate to the display device the first version of the received video stream during a first time period, and wherein an audio signal with full resolution is provided to the display device during the first time period.

7. The video stream processing system of claim 6, wherein the video generation modules switches from communicating the first version of the received video stream to communicating the second version of the received video stream to the display device during an interim time period, and wherein the display device displays a blurred image during the interim time period.

8. The method of claim 6, wherein the first version has a reduced color set with respect to the second version.

9. A method of displaying a video stream, the method comprising:
   receiving a video stream to be displayed on a display device;
   displaying a first portion of the video stream according to first display characteristics while recovering a second portion of the video stream, wherein the first display characteristics comprise a first resolution, and wherein the first portion of the video stream is displayed during a first time period and an audio signal is provided to the display device with full resolution during the first time period;
   switching from displaying the first portion of the video stream to displaying the second portion of the video stream, wherein the second portion of the video stream is displayed according to second display characteristics, wherein the second display characteristics comprise a second resolution, and the second resolution is higher than the first resolution; and
   displaying a blurred image on the display device while switching from displaying the first portion of the video stream to displaying the second portion of the video stream.

10. The method of claim 9, wherein the first portion has a reduced color set with respect to the second portion.

* * * * *